(12) United States Patent
Nag

(10) Patent No.: US 8,484,981 B2
(45) Date of Patent: Jul. 16, 2013

(54) INTEGRATED FUEL GAS CHARACTERIZATION SYSTEM

(75) Inventor: Pratyush Nag, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1076 days.

(21) Appl. No.: 12/198,438

(22) Filed: Aug. 26, 2008

(65) Prior Publication Data

US 2010/0050641 A1   Mar. 4, 2010

(51) Int. Cl.
F02C 7/22 (2006.01)
F02C 9/00 (2006.01)

(52) U.S. Cl.
USPC ............ 60/776; 60/39.27; 60/39.281

(58) Field of Classification Search
USPC ........... 60/233, 39.24, 238, 243, 773, 776, 60/790, 793, 39.26, 39.27, 39.281
See application file for complete search history.

(56) References Cited

U.S. PATENT DOCUMENTS

| | | | |
|---|---|---|---|
| 4,359,284 A * | 11/1982 | Kude et al. ............ | 374/37 |
| 4,380,898 A | 4/1983 | Cantwell | |
| 4,716,723 A | 1/1988 | Ralston et al. | |
| 4,735,052 A | 4/1988 | Maeda et al. | |
| 4,993,221 A | 2/1991 | Idelchik | |
| 4,994,959 A * | 2/1991 | Ovenden et al. ............ | 700/33 |
| 5,423,175 A | 6/1995 | Beebe et al. | |
| 5,487,265 A | 1/1996 | Rajamani et al. | |
| 6,082,092 A | 7/2000 | Vandervort | |
| 6,226,976 B1 | 5/2001 | Scott et al. | |
| 6,338,240 B1 * | 1/2002 | Endo et al. .............. | 60/773 |
| 6,343,462 B1 * | 2/2002 | Drnevich et al. ........... | 60/775 |
| 6,502,402 B1 * | 1/2003 | Smith et al. .............. | 60/775 |
| 6,637,184 B2 | 10/2003 | Freeman | |
| 6,761,032 B2 | 7/2004 | Moser | |
| 7,188,465 B2 | 3/2007 | Kothnur et al. | |
| 7,218,973 B2 | 5/2007 | Johnson et al. | |
| 7,905,082 B2 * | 3/2011 | Estrada et al. .......... | 60/39.511 |
| 2003/0217555 A1 * | 11/2003 | Gerhold ................ | 60/776 |
| 2004/0106078 A1 * | 6/2004 | Goebel ................. | 431/12 |
| 2005/0028530 A1 | 2/2005 | Doebbeling et al. | |
| 2006/0185367 A1 * | 8/2006 | Hino et al. .............. | 60/772 |
| 2007/0082306 A1 * | 4/2007 | Drnevich et al. ........... | 431/12 |
| 2007/0113560 A1 | 5/2007 | Steber et al. | |
| 2007/0119178 A1 | 5/2007 | Berenbrink et al. | |
| 2008/0168774 A1 * | 7/2008 | Drnevich et al. .......... | 60/777 |
| 2009/0071118 A1 * | 3/2009 | Ma et al. ............... | 60/39.26 |
| 2009/0107105 A1 * | 4/2009 | Ziminsky et al. ........ | 60/39.463 |
| 2009/0320489 A1 * | 12/2009 | Estrada et al. ............ | 60/772 |
| 2010/0162678 A1 * | 7/2010 | Annigeri et al. ......... | 60/39.281 |

FOREIGN PATENT DOCUMENTS

| | | |
|---|---|---|
| EP | 0965898 | 12/1999 |
| JP | 11-324727 | 11/1999 |

OTHER PUBLICATIONS

Margue Croteau, Siemens Power Generating, Inc., "Liquified Natural Gas Fuel Alternatives," Aug. 2006, presentation to Western Executives Conference.

* cited by examiner

Primary Examiner — Gerald Sung

(57) ABSTRACT

A gas turbine engine that includes a compressor, a combustion stage, a turbine assembly, a fuel gas feed system for supplying fuel gas to a combustion stage of the gas turbine, an integrated fuel gas characterization system, and a buffer tank is disclosed. The integrated fuel gas characterization system may determine the heating value of the fuel and adjust either the airflow to the compressor or the fuel gas flow to the combustor to maintain a design fuel-to-air ratio.

9 Claims, 2 Drawing Sheets

INTEGRATED FUEL GAS CHARACTERIZATION SYSTEM

FIELD OF THE INVENTION

The invention is directed generally to a fuel gas characterization system for operating a gas turbine engine, and more particularly to a system for proactively adjusting operating parameters of the gas turbine engine due to changes in fuel gas composition.

BACKGROUND OF THE INVENTION

Much of the power generation capacity in North America is provided by gas-fired turbines. These gas-fired turbines are general optimized to operate using fuel gas with a constant energy content. Significant variations in fuel gas energy content can result in the need for an extended shut down of the gas-fired turbine while the turbine control systems are adjusted to operate using the new fuel gas. Variations in fuel gas energy content is becoming more commonplace with greater imports of liquid natural gas (LNG).

Where the fuel gas energy content variations do not require shut down of the gas-fired turbine, the change in fuel gas energy content results in substantial megawatt load swings, engine overfiring, and increased emissions of undesirable pollutants, such as $NO_X$ and CO. This is because the majority of gas turbine engines are designed using feedback control systems. Thus, while turbine component manufacturers design turbine components to handle the extreme firing temperatures and loads experienced during design conditions, turbine component life can be reduced due to extreme temperatures or forced caused by overfiring, megawatt load swings, or both.

Where gas-fired turbine control systems are designed to accommodate fuel gas energy content changes, the control systems generally use feedback loops that analyze the temperature of gases exiting the turbine or the level of pollutants exiting the turbine. The amount of energy supplied by the fuel gas is then adjusted by heating or cooling the fuel gas or injecting an inert material into the fuel gas. However, by the time the adjustment is made, the gas turbine engine has already experienced a megawatt load swing, which can damage turbine engine components These prior art systems also often fail to address operational issues including, but not limited to, increased combustor dynamics, increased flashback potential and reduced start-up reliability. Thus, a need exists for an improved gas-fired turbine engine.

SUMMARY OF THE INVENTION

This invention is directed to a gas turbine engine that includes an integrated fuel gas characterization system with a buffer tank and a control system capable of determining a heating value of a fuel gas and adjusting one or more heating value operating parameters to account for the heating value of the fuel gas to maintain a design fuel-to-air ratio. By accounting for the heating value of the fuel gas, the turbine engine is able to operate more efficiently and maintain a design fuel-to-air ratio. In instances where a heating value increase is detected, the turbine engine may experience an increase in power output by adjusting the heating value operating parameters.

The control system of the integrated fuel gas characterization system may be a feed forward system that adjusts operating parameters of the gas turbine engine based on the absolute value of fuel gas properties, the rate of change of fuel gas properties, or both, as the fuel gas changes reaches the combustion chamber. In addition, the buffer tank may reduce the effects of changes in fuel gas properties by facilitating mixing of fuel gas compositions and providing a buffer period for the control system to take the multiple readings to determine the rate of change of fuel gas properties. Thus, the integrated fuel gas characterization system can minimize or eliminate megawatt load swings experienced by the gas turbine engine, extending turbine component life and reducing other operational issues, such as the risk of flashback, engine overfiring, increased emissions, and exhaust stream temperature spikes.

The integrated fuel gas characterization system can also be used to improve start-up reliability. The control system of the integrated fuel gas characterization system stores earlier readings of the fuel gas composition, generally using the gas chromatograph and uses this data to adjust the operating parameters of the gas turbine engine before start-up. This approach significantly improves start-up reliability, particularly where the gas turbine engine uses a variety of fuels with different compositions.

In one embodiment, the present invention is directed to a gas turbine engine that can include a gas turbine, a fuel gas feed system for supplying fuel gas to a combustion stage of the gas turbine, and an integrated fuel gas characterization system including a buffer tank. The gas turbine can include a compressor, a combustion stage and a turbine assembly. The integrated fuel gas characterization system can analyze fuel gas in the fuel gas feed system. In particular, the integrated fuel gas characterization system can include a Wobbe meter for measuring a Wobbe Index of fuel gas before the fuel gas is combusted in the gas turbine, a gas chromatograph for measuring individual gas constituents in the fuel gas before the fuel gas is combusted in the gas turbine, and a modification to the gas turbine control system. The control system modification can be designed to adjust one or more operating parameters of the gas turbine engine based on the rate of change of the Wobbe Index, the individual gas constituents, or both, as determined by the control system.

The integrated fuel gas characterization system can proactively adjust the operating parameters of the gas turbine engine during a dynamic fuel event. The dynamic fuel event can be a gas turbine engine start-up or a change in the energy content of the fuel gas flowing through the fuel gas feed system. As used herein, "proactively" means that the operating parameter is adjusted prior to or concurrently with the arrival of the sampled fuel gas at the combustion stage. The control system for determining the rate of change of the Wobbe Index, individual gas constituents, or both, can calculate the rate of change using at least three readings from the Wobbe meter or the gas chromatograph. The integrated fuel gas characterization system can include control logic to filter out transient spikes in a Wobbe Index of the fuel gas, the individual gas constituents in the fuel gas, or both.

The integrated fuel gas characterization system can analyze the fuel gas upstream of the buffer tank. The at least one operating parameter that can be adjusted by the control system can be one or more of the following parameters: the megawatt controller gain value, megawatt controller reset value, exhaust temperature controller gain value, exhaust temperature controller reset value, blade path temperature controller gain value, blade path temperature controller reset value, ignition fuel mass flow setpoint value, pilot valve ignition lift, fuel gas distribution among combustion stages, and the combustor fuel stage throttle valve ignition lifts. As used herein, "combustor fuel stage" is meant to describe any combustor fuel stage including, but not limited to, pilot stages, diffusion stages, and premix stages.

The buffer tank can be designed to facilitate mixing of fuel gas fed through the buffer tank. The average residence time of fuel gas fed through the buffer tank when the gas turbine is operating at full load can be sufficient for the integrated fuel gas characterization system to take readings from the fuel gas and adjust the operating parameters of the gas turbine engine at or before a time when the sampled fuel gas enters a combustion stage of the gas turbine engine. The average residence time of fuel gas fed through the buffer tank when the gas turbine is operating at full load can be at least five seconds.

The integrated fuel gas characterization system may be useful to assist in operation of a turbine engine by providing an integrated fuel gas characterization system that includes devices for measuring a Wobbe Index and for adjusting at least one operating parameter of the gas turbine engine. The system may measure the Wobbe Index of fuel gas flowing through a fuel gas feed system and mix fuel gas in a buffer tank, wherein the buffer tank is positioned between a sampling point and a nozzle in a combustion stage of a turbine. At least one operating parameter of the gas turbine engine may be adjusted based on the rate of change of the Wobbe Index as determined by the integrated fuel gas characterization system, wherein the integrated fuel gas characterization system proactively adjusts the at least one operating parameter of the gas turbine engine during a dynamic fuel event. The integrated fuel gas characterization system may determine a heating value of the fuel gas and may adjust a heating value operating parameter to account for the heating value of the fuel gas to maintain a design fuel-to-air ratio.

The heating value operating parameter may include the amount of air supplied to the compressor or the amount of fuel supplied to the combustor. Adjusting the heating value operating parameter to account for the heating value of the fuel gas may include adjusting inlet guide vanes to change air flow into a compressor. If an increase in heating value is identified, then the inlet guide vanes may be adjusted to allow greater airflow into the compressor, or the fuel flow to the combustor may be reduced, or both. If a decrease in heating value is identified, then the inlet guide vanes may be adjusted to allow less airflow into the compressor, or the fuel flow to the combustor may be increased, or both.

The integrated fuel gas characterization system may also facilitate operation of a gas turbine engine during a dynamic fuel event. In particular, an integrated fuel gas characterization system may be provided that includes devices for sampling the Wobbe Index, individual gas constituents, or both, and can adjust at least one operating parameter of the gas turbine engine. The integrated fuel gas characterization system may sample the Wobbe Index, individual gas constituents, or both, of fuel gas flowing through a sampling point of a fuel gas feed system; mix fuel gas in a buffer tank, and adjust at least one operating parameter of the gas turbine engine based on the rate of change of the Wobbe Index, the individual gas constituents, or both, as determined by the integrated fuel gas characterization system. The integrated fuel gas characterization system can proactively adjust one or more operating parameters of the gas turbine engine during a dynamic fuel event. The operating parameters of the gas turbine engine adjusted during a dynamic fuel event can be adjusted to improve start-up reliability, minimize exhaust temperature spikes, minimize engine overfiring, minimize flashback, reduce emissions, avoid megawatt load swings, or a combination thereof. The dynamic fuel event can be a gas turbine engine start-up, and the start-up settings of the gas turbine engine can be adjusted based on a fuel gas composition measured prior to start-up of the gas turbine engine. The dynamic fuel event can be a change in the energy content of the fuel gas flowing through the fuel gas feed system.

The method can also include the step of calibrating the Wobbe Index value using the individual gas constituent values measured using a gas chromatograph. The method can also include determining whether a measured reading of Wobbe Index and/or fuel gas constituent reading is a transient spike, and filtering out Wobbe Index and/or fuel gas constituent readings that are transient spikes. As used herein, "transient spike" is used to describe both temporary spikes in Wobbe Index or fuel gas constituent values of the fuel gas and individual Wobbe Index or fuel gas constituent readings that are not accurate due to bad quality signals produced by the Wobbe Meter.

An advantage of this invention is that the turbine engine may operate efficiently while using fuel gas having differently heating values. Thus, fuel gas that is provided from different sources, with likely different heating values, is not problematic for use in the turbine engine.

Another advantage of this invention is that it allows continuous operation of a gas turbine engine while the fuel gas composition changes with a reduced risk of: exhaust stream temperature spikes, engine overfiring, flashback, megawatt load swings, increased emissions, and unnecessary strain of turbine components.

Yet another advantage of this invention is that it can take advantage of the increase in the heating value of the fuel and increase the power output of the gas turbine. This can be accomplished by modifying the amount of air-intake to the extent of the change in the heating value of the fuel, thus keeping a constant air-to-fuel ratio. Hence, the power output can be increased without increasing the fuel consumption.

Another advantage of the invention is that it provides improved start-up reliability across a wide range of fuel gas compositions and energy content.

Still another advantage of the invention is that it provides proactive control of the operating parameters and mixing of the different fuel gas compositions to avoid substantial megawatt load swings and maintain safe operating conditions during dynamic fuel events.

Another advantage of the invention is that it provides extended turbine component life, by reducing or eliminating occurrences of overfiring and megawatt load swings during dynamic fuel events.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
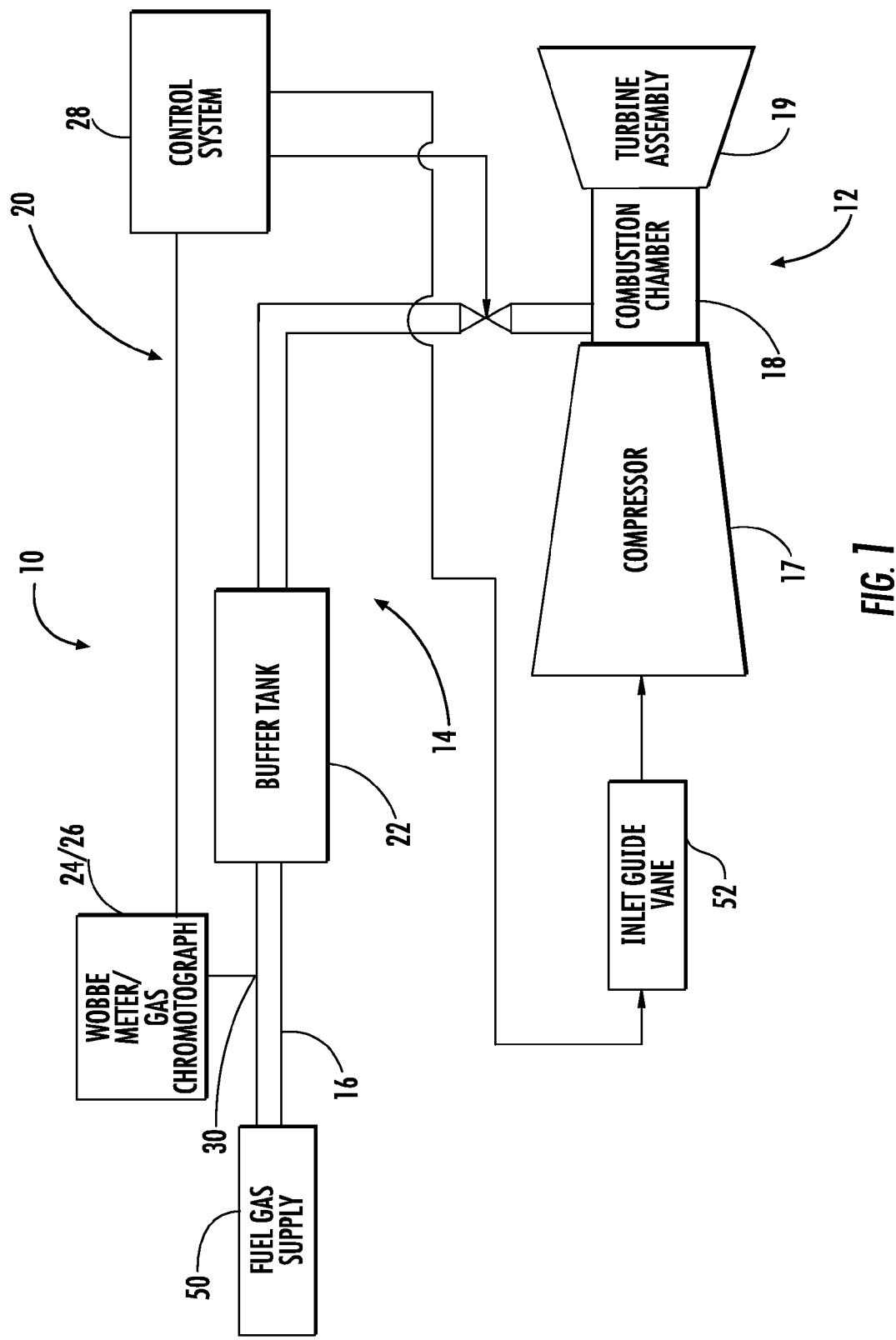
FIG. 1 is a schematic of an embodiment of the inventive integrated fuel gas characterization system.
Figure 2:
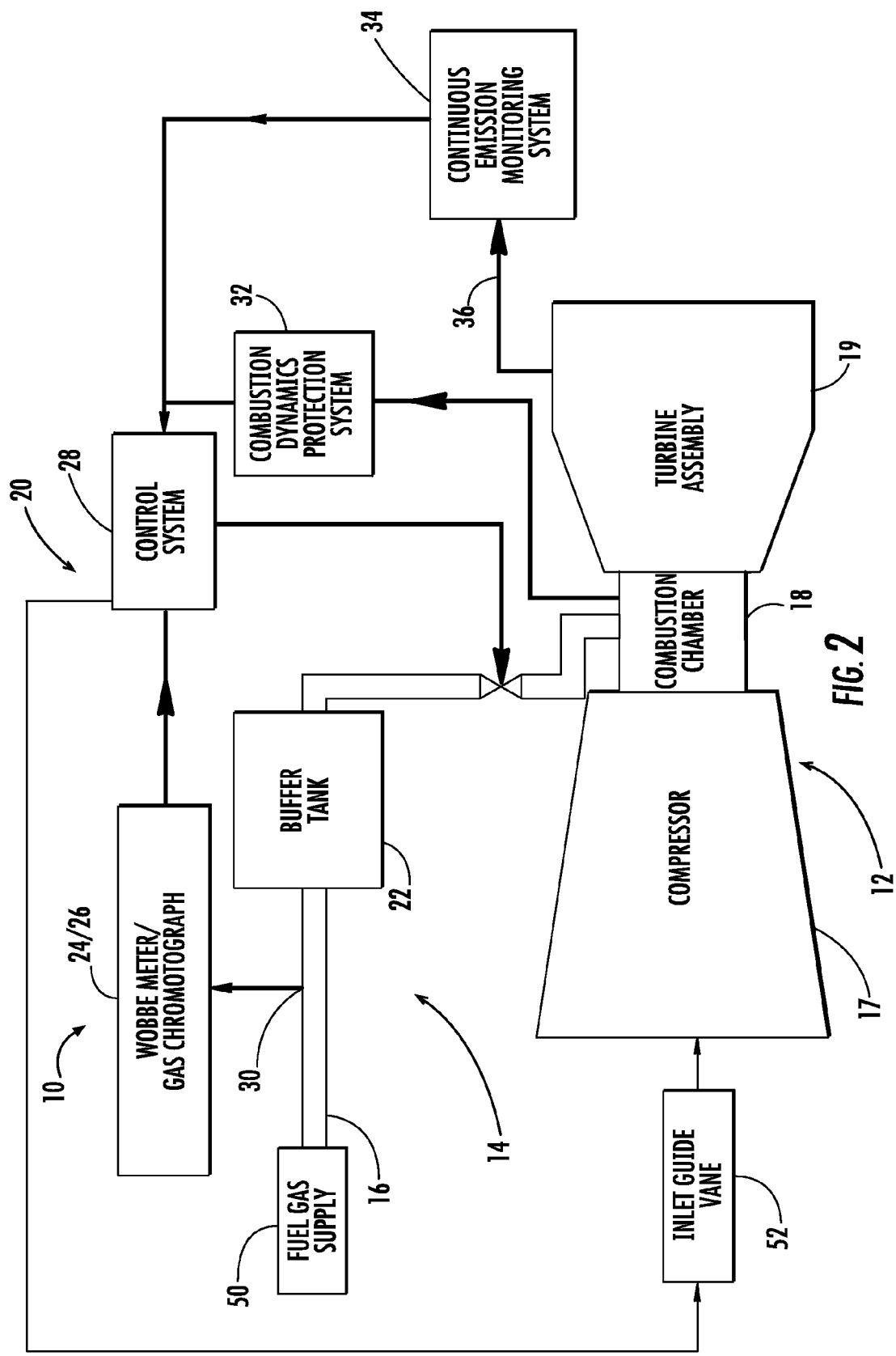
FIG. 2 is a schematic of another embodiment of the inventive integrated fuel gas characterization system that includes monitoring of emissions and combustor dynamics.

As shown in FIGS. 1-2, the invention is directed to a gas turbine engine 10 that includes an integrated fuel gas characterization system 20 having a buffer tank 22 and a control system 28. The control system 28 of the integrated fuel gas characterization system 20 is a proactive, or feed forward, system that adjusts operating parameters of the gas turbine engine 10 based on the rate of change of fuel gas 16 properties. The operating parameters can be adjusted at or before the time when the changes to the fuel gas 16 composition reach the combustion chamber 18. The control system 28 may also be configured to determine heating value changes in the fuel gas and adjust the air flow to the compressor 17 or fuel gas flow to the combustor 18, or both, to maintain a design fuel-to-air ratio. By sensing heating value changes of the fuel gas and adjusting the air or fuel gas flow, the control system 28 enables the gas turbine engine 10 to operate more efficiently by taking advantage of increases in heating value changes that may occur with the introduction of different fuel sources, such as LNG, to the fuel supply.

The buffer tank 22 of the integrated fuel gas characterization system 20 can facilitate mixing of fuel gas 16 compositions so that fuel gas 16 compositional changes reach the gas turbine 12 gradually, rather than abruptly. The buffer tank 22 can also provide a delay period sufficient for the control system 28 to take multiple readings of the fuel gas 16 composition and determine the rate of change of fuel gas 16 properties. The integrated fuel gas characterization system 20 can utilize the buffer tank 20 and the control system 28 to minimize or eliminate megawatt load swings experienced by the gas turbine engine 10, thereby extending turbine component life and reducing other operational issues, such as the risk of flashback, engine overfiring, and increased emissions.

The integrated fuel gas characterization system 20 also can improve start-up reliability. The control system 28 of the integrated fuel gas characterization system 20 may store the most recent readings of the fuel gas 16 composition, generally using the gas chromatograph 26, and may use this data to adjust the operating parameters of the gas turbine engine 10 before start-up. As such, the control system 28 significantly improves start-up reliability, particularly where the gas turbine engine 10 uses a variety of fuels with different compositions.

The gas turbine engine 10 may be formed from components including: a gas turbine 12, a fuel gas feed system 14 for supplying fuel gas 16 to a combustion stage 18 of the gas turbine 12, and an integrated fuel gas characterization system 20. The gas turbine 12 can include a compressor 17, a combustion stage 18, and a turbine assembly 19. The integrated fuel gas feed system 14 can also include a buffer tank 22. The integrated fuel gas characterization system 14 may be configured to analyze fuel gas 16 in the fuel gas feed system 14. The integrated fuel gas characterization system 20 can include a Wobbe meter 24 for measuring the Wobbe Index of fuel gas 16 before the fuel gas 16 is combusted in the gas turbine 12, a gas chromatograph 26 for measuring individual gas constituents in the fuel gas 16 before the fuel gas 16 is combusted in the gas turbine 12, and a control system 28. The control system 28 can be designed to adjust one or more operating parameters of the gas turbine engine 10 based on the rate of change of the Wobbe Index, the individual gas constituents, or both, as determined by the control system 28.

The integrated fuel gas characterization system 20 can proactively adjust the operating parameters of the gas turbine engine 10 during a dynamic fuel event. The dynamic fuel event can be a gas turbine engine start-up or a change in the energy content of the fuel gas 16 flowing through the fuel gas feed system 14. As used herein, "proactively" is used to describe operating parameter adjustments occur prior to or concurrently with the arrival of the sampled fuel gas 16 at the combustion stage 18. The control system 28 for determining the rate of change of the Wobbe Index, individual gas constituents, or both, can calculate the rate of change using at least three readings from the Wobbe meter 24 or the gas chromatograph 26. The integrated fuel gas characterization system 20 can include control logic to filter out transient spikes in a Wobbe Index of the fuel gas 16, the individual gas constituents in the fuel gas 16, or both.

Wobbe meter 24 and gas chromatograph 26 readings can be taken independently and intermittently. The period between readings can be at least 1 second, at least 2 seconds, at least 5 seconds, or at least 10 seconds, or other time periods. The gas chromatograph 26 can be used to calibrate the Wobbe meter 24. In some instances, the period between gas chromatograph readings can be at least two minutes, at least five minutes, at least ten minutes, or another time period. The gas chromatograph 26 can also be used to obtain a highly accurate fuel gas constituent measurement prior to gas turbine 12 start-up. A fuel gas constituent measurement made before gas turbine start-up may include a measurement made during an earlier gas turbine shut down, a measurement made immediately before start up of the gas turbine 12, and all times in between.

Alternately, fuel gas constituent readings may be made using IR sensors. IR sensor data is more limited than that acquired using a gas chromatograph 26. However, gas chromatograph 26 measurements of fuel gas constituents generally take significantly longer to obtain. Gas chromatograph 26 measurements of fuel gas constituents can generally be used as a quality check of the Wobbe meter 24 and for evaluating the fuel gas constituents before start up.

The integrated fuel gas characterization system 20 can take readings of the fuel gas 16 upstream of the buffer tank 22, at the entrance of the buffer tank 22, or in the buffer tank 22. The at least one operating parameter that can be adjusted by the control system 28 can be one or more of the megawatt controller gain value, megawatt controller reset value, exhaust temperature controller gain value, exhaust temperature controller reset value, blade path temperature controller gain value, blade path temperature controller reset value, ignition fuel mass flow setpoint value, fuel gas distribution among combustion stages 18, and combustor fuel stage throttle valve ignition lifts.

The buffer tank 22 can be designed to facilitate mixing of fuel gas 16 fed through the buffer tank 22. The capacity of the buffer tank 22 can be large enough that the average residence time of fuel gas 16 fed through the buffer tank 22 when the gas turbine 12 is operating at full load can be sufficient for the integrated fuel gas characterization system 20 to take multiple readings from the fuel gas 16 and adjust the operating parameters of the gas turbine engine 10 at or before a time when sampled fuel gas 16 enters a combustion stage 18 of the gas turbine engine 10. For example, the capacity of the buffer tank 22 can be large enough that the average residence time may be sufficient to make at least three readings, at least five readings, or at least seven readings of the Wobbe Index of the fuel gas constituents. The average residence time of fuel gas 16 fed through the buffer tank 22 when the gas turbine 12 is operating at full load can be at least five seconds, at least ten seconds, or at least thirty seconds. These features of the buffer tank 22 can enable feed forward processing using rate of change in fuel gas constituent values, which require multiple fuel gas constituent readings to calculate.

The buffer tank 22 can be positioned between the sampling point 30 and the combustion stage 18 of the gas turbine 12. The buffer tank 22 can be used to reduce the rate of change in Wobbe Index and/or individual gas constituents of the fuel gas 16 reaching the combustion chamber 18 as compared to a gas turbine engine 10 without a buffer tank 22.

The buffer tank 22 provides numerous advantages for the inventive integrated fuel gas characterization system 20. For example, when there is a change in the fuel gas constituents, the buffer tank 22 mixes the new fuel gas 16 composition with the old fuel gas 16 composition, thereby reducing the rate of change in fuel gas 16 properties experienced by the gas turbine 12 and the resultant megawatt load swing and spike in exhaust stream temperature. This same effect helps to minimize or eliminate the impact of transient spikes in the fuel gas 16 properties.

In addition, the buffer tank 22 can provide sufficient time for the integrated fuel gas characterization system 20 to analyze several intermittent Wobbe Index and/or fuel gas constituent readings of the fuel gas 16 before the fuel gas 16 being measured reaches the combustion stage 18. The volume of the buffer tank 22 enables minimization or elimination of megawatt load swings because it allows the integrated fuel gas characterization system 20 to implement operating parameter changes concurrently with, or prior to, when the change in fuel gas 16 composition reaches the combustion stage 18. In addition, the buffer period created by the buffer tank 22 allows the integrated fuel gas characterization system 20 to identify and filter out transient fuel gas 16 composition spikes before gas turbine 12 operating parameters are adjusted. The buffer period also allows the integrated fuel gas characterization system 20 to calculate the rate of change in the fuel gas 16 properties and adjust the gas turbine 12 operating parameters based on this rate of change, rather than the absolute value of the fuel gas 16 properties.

In addition to the feed forward aspects of the present invention, which can serve to eliminate megawatt load swings and minimize exhaust stream temperature spikes, the gas turbine engine 10 can also include feedback elements, such as a Combustor Dynamics Protection System (CDPS) system 32 or a continuous emissions monitoring system (CEMS) 34. As shown in FIG. 2, the CDPS system 32 can be used to evaluate the dynamics of the combustion stage 18. As shown in FIG. 2, the exhaust stream 36 from the turbine assembly 19 can be measured by a CEMS system 34. The CEMS system 34 can measure the exhaust stream 36 temperature or the amount of pollutants, e.g. $NO_X$ and CO, or both, in the exhaust stream 36 and feed this information back to the control system 28. The control system 28 algorithm can account for data from the integrated fuel gas characterization system 20, as well as, the CDPS system 32 and the CEMS system 34.

In some embodiments, the control system 28 can also control the temperature of the fuel gas 16 entering the combustion stage 18. At a given Wobbe Index, the actual amount of energy generated in the combustion stage 18 is, at least in part, a function of the temperature of the fuel gas 16 and any additional amount of inert media entering the combustion stage 18. Thus, while not the primary means of controlling combustor dynamics, modifications to the temperature of the fuel gas entering the combustion stage 18 and the injection of inert media into the combustion stage 18 can also be used to control combustor dynamics and emissions of the gas turbine engine 10.

The control system 28 may also be in communication with the fuel supply system 50 and the air intake system, which may be inlet guide vanes 52. The control system 28 may be configured to identify the heating values of the fuel gas and compare it against known heating values. The control system 28 may be configured to adjust the fuel flow to the combustor 18 or the air flow to the compressor 17 to maintain a design fuel-to-air ratio. In doing so, the control system 28 enables the turbine engine 10 to operate more efficiently.

The gas turbine engine 10 may be operated during a dynamic fuel event such that a method of operating the gas turbine engine 10 includes providing an integrated fuel gas characterization system 20 that can include: devices for sampling the Wobbe Index 24, individual gas constituents 26, or both 24, 26, and for adjusting at least one operating parameter of the gas turbine engine 10; sampling the Wobbe Index, individual gas constituents, or both, of fuel gas 16 flowing through a sampling point 30 of a fuel gas feed system 14; mixing fuel gas 16 in a buffer tank 22, and adjusting at least one operating parameter of the gas turbine engine 10 based on the rate of change of the Wobbe Index, the individual gas constituents, or both, as determined by the integrated fuel gas characterization system 20. The at least one operating parameter of the gas turbine engine 10 can also be adjusted based on the actual value of the Wobbe Index, the individual gas constituents, or both, as determined by the integrated fuel gas characterization system 20.

The method can also include the step of calibrating the Wobbe Index value using the individual fuel gas constituent values, wherein the individual fuel gas constituent values are measured using a gas chromatograph 26. The method can also include determining whether a measured reading of Wobbe Index, fuel gas constituents, or both, is a transient spike, and filtering out Wobbe Index, fuel gas constituent readings, or both, that are transient spikes.

The integrated fuel gas characterization system 20 can proactively adjust the at least one operating parameter of the gas turbine engine 10 during a dynamic fuel event. The operating parameters of the gas turbine engine 10 adjusted during a dynamic fuel event can be adjusted to improve start-up reliability, minimize exhaust stream temperature spikes, minimize engine overfiring, minimize flashback, reduce emissions, avoid megawatt load swings, or a combination thereof.

The integrated fuel gas characterization system 20 can provide improved gas turbine 12 start-up reliability for fuel gas 16 with a wide variety of Wobbe Indexes and individual gas constituents by proactively adjusting gas turbine 12 operating parameters. Because the integrated fuel gas characterization system 20 adjusts the operating parameters of the gas turbine 12 based on fuel gas constituent readings of the fuel gas 16 in the fuel gas feed system 14 before start-up, the start-up reliability of the gas turbine is significantly improved. This is particularly true where the source of fuel gas constituents varies because the gas turbine 12 is operated using fuel gas 16 from a variety of sources. This allows changes of fuel gas 16 to be implemented without lengthy delays to adjust the control system 28 when there is a switch in fuel gas 16. The integrated fuel gas characterization system 20 reduces or eliminates megawatt load swings during such dynamic fuel events, by utilizing an integrated fuel gas characterization system 20. The integrated fuel gas characterization system 20 reduces the swings with a feed forward approach to adjusting operating parameters of the gas turbine engine 10 and utilization of a buffer tank 22.

During gas turbine 12 start-up, the integrated fuel gas characterization system 20, can rely on gas chromatograph 26 analysis of the fuel gas 16 from prior to gas turbine 12 start-up. The integrated fuel gas characterization system 20 can utilize the results of the gas chromatograph 26 analysis of the fuel gas 16 to set operating parameters, which will improve gas turbine 12 start-up reliability as compared to conventional gas turbine 12 control systems. Operating parameters that are of particular relevance for gas turbine 12 start-up include, but are not limited to, ignition fuel mass flow setpoint and combustor fuel stage throttle valve ignition lifts.

The integrated fuel gas characterization system 20 can determine a heating value of the fuel gas 16 and adjust a heating value operating parameter to account for the heating value of the fuel gas 16 to maintain a design fuel-to-air ratio.

The heating value operating parameter that may be adjusted may be the fuel gas 16 or air or both. If the integrated fuel gas characterization system 20 determines that a fuel gas 16 has an increased heating value, the amount of air supplied to the turbine engine 10 may be increased. In particular, the inlet guide vanes 52 may be adjusted to allow more air to enter the compressor 17 to maintain a constant fuel-to-air ratio. Alternatively, the amount of fuel gas 16 may be reduced to maintain a constant fuel-to-air ratio. If the integrated fuel gas characterization system 20 determines that a fuel gas 16 has a decreased heating value, the amount of air supplied to the turbine engine 10 may be decreased. In particular, the inlet guide vanes 52 may be adjusted to supply less air to enter the compressor 17 to maintain a constant fuel-to-air ratio. Alternatively, the amount of fuel gas 16 may be increased to maintain a constant fuel-to-air ratio. In some embodiments when an increase in heating value of the fuel gas 16 is identified, the amount of air delivered to the compressor 17 may be increased and the fuel flow may be decreased. Conversely, in embodiments where a decrease in the heating value of the fuel gas 16 is identified, the amount of air delivered to the compressor 17 may be decreased and the fuel flow may be increased.

For example, if the heating value is determined to have increased by about four percent, then the inlet guide vanes 52 may be adjusted to allow about four percent more air into the compressor 17. This ensures that the fuel-to-air ratio remains unchanged in the combustor section 18. Maintaining a constant fuel-to-air ratio maintains engine operability, reduces the potential for flashback and maintains emissions within permitted limits. Because the engine 10 is operating at the same fuel-to-air ratio, the engine operates at the same turbine inlet temperature but the total mass flow into the engine 10 has increased by about four percent. Because the power output is directionally proportional to the massflow, the engine 10 experiences a power output increase of about four percent for this fuel gas. By configuring the integrated fuel gas characterization system 20 in this manner, different fuels may be used in the turbine engine 10 effectively. In particular, LNG fuels from different supply sources may be burned without negatively impacting the efficiency of the turbine engine 10.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of operating a gas turbine engine during a dynamic fuel event, comprising: providing an integrated fuel gas characterization system including a device for measuring a Wobbe Index and for adjusting at least one operating parameter of the gas turbine engine; measuring, at a sampling point, the Wobbe Index of fuel gas flowing through a fuel gas feed system; mixing the fuel gas in a buffer tank, wherein the buffer tank is positioned between the sampling point and a nozzle in a combustion stage of a turbine; adjusting the at least one operating parameter of the gas turbine engine based on a rate of change of the Wobbe Index as determined by the integrated fuel gas characterization system, wherein the integrated fuel gas characterization system proactively adjusts the at least one operating parameter of the gas turbine engine during the dynamic fuel event; determining a heating value of the fuel gas; adjusting a heating value operating parameter to account for the heating value of the fuel gas to maintain a design fuel-to-air ratio; wherein adjusting a heating value operating parameter to account for the heating value of the fuel gas comprises adjusting inlet guide vanes to change air flow into a compressor; and wherein mixing the fuel gas in the buffer tank provides delay time such that the at least one operating parameter of the gas turbine engine may be adjusted before sampled fuel that caused the rate of change of the Wobbe Index as determined by the integrated fuel gas characterization system is passed from the buffer tank to the nozzle in the combustion stage of the turbine.

2. The method of claim 1, wherein adjusting inlet guide vanes to change air flow into a compressor comprises adjusting the inlet guide vanes to allow greater airflow into the compressor when an increase in the heating value is identified.

3. The method of claim 1, wherein adjusting inlet guide vanes to change air flow into a compressor comprises adjusting the inlet guide vanes to allow less airflow into the compressor when a decrease in the heating value is identified.

4. The method of claim 1, wherein adjusting a heating value operating parameter to account for the heating value of fuel gas comprises adjusting the fuel gas flow into the combustion section.

5. The method of claim 4, wherein adjusting fuel gas flow into the combustion section comprises decreasing the fuel gas flow when an increase in the heating value is identified.

6. The method of claim 4, wherein adjusting the fuel gas flow into the combustion section comprises increasing the fuel gas flow when a decrease in the heating value is identified.

7. A method of operating a gas turbine engine during a dynamic fuel event, comprising: providing an integrated fuel gas characterization system including a device for measuring a Wobbe Index and for adjusting at least one operating parameter of the gas turbine engine; measuring, at a sampling point, the Wobbe Index of fuel gas flowing through a fuel gas feed system; mixing the fuel gas in a buffer tank, wherein the buffer tank is positioned between the sampling point and a nozzle in a combustion stage of a turbine; adjusting the at least one operating parameter of the gas turbine engine based on a rate of change of the Wobbe Index as determined by the integrated fuel gas characterization system, wherein the integrated fuel gas characterization system proactively adjusts the at least one operating parameter of the gas turbine engine during the dynamic fuel event; identifying a heating value increase of the fuel gas; and providing an increased amount of air to a compressor of the gas turbine engine to maintain a design fuel-to-air ratio by adjusting inlet guide vanes to increase the amount of air flowing to the compressor to maintain the design fuel-to-air ratio; and wherein mixing the fuel gas in the buffer tank provides delay time such that the at least one operating parameter of the gas turbine engine may be adjusted before sampled fuel that caused the rate of change of the Wobbe Index as determined by the integrated fuel gas characterization system is passed from the buffer tank to the nozzle in the combustion stage of the turbine.

8. A method of operating a gas turbine engine during a dynamic fuel event, comprising: providing an integrated fuel gas characterization system including a device for measuring a Wobbe Index and for adjusting at least one operating parameter of the gas turbine engine; measuring, at a sampling point, the Wobbe Index of fuel gas flowing through a fuel gas feed system; mixing the fuel gas in a buffer tank, wherein the buffer tank is positioned between the sampling point and a nozzle in a combustion stage of a turbine; adjusting the at least one operating parameter of the gas turbine engine based on a rate of change of the Wobbe Index as determined by the integrated fuel gas characterization system, wherein the integrated fuel gas characterization system proactively adjusts the at least one operating parameter of the gas turbine engine during the dynamic fuel event; identifying a heating value increase of the fuel gas; and adjusting an amount of the fuel gas flowing to the gas turbine engine to compensate for the heating value increase to maintain a design fuel-to-air ratio and adjusting inlet guide vanes to increase an amount of air flowing to a compressor to maintain the design fuel-to-air ratio; and wherein mixing the fuel gas in the buffer tank provides delay time such that the at least one operating parameter of the gas turbine engine may be adjusted before sampled fuel that caused the rate of change of the Wobbe Index as determined by the integrated fuel gas characterization system is passed from the buffer tank to the nozzle in the combustion stage of the turbine.

9. The method of claim 8, wherein adjusting an amount of fuel gas flowing to the gas turbine engine to compensate for the heating value increase comprises reducing the amount of fuel gas flowing to the gas turbine engine to maintain the design fuel-to-air ratio.

\* \* \* \* \*